US 6,585,598 B2

(12) United States Patent
Nguyen et al.

(10) Patent No.: US 6,585,598 B2
(45) Date of Patent: Jul. 1, 2003

(54) METHOD FOR CASHLESS GAMING

(75) Inventors: Binh T. Nguyen, Reno, NV (US); Craig A. Paulsen, Reno, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 09/895,475

(22) Filed: Jun. 28, 2001

(65) Prior Publication Data

US 2003/0003996 A1 Jan. 2, 2003

(51) Int. Cl.⁷ .......................... G06F 17/00; G06F 17/60
(52) U.S. Cl. ............................................ 463/41; 705/39
(58) Field of Search .................. 463/16, 29, 40–42, 463/39, 25; 705/14, 17–18, 39, 41–42; 902/2, 23

(56) References Cited

U.S. PATENT DOCUMENTS

| | | | |
|---|---|---|---|
| 5,038,022 A | 8/1991 | Lucero | 235/380 |
| 5,221,838 A * | 6/1993 | Gutman et al. | 235/379 |
| 5,457,306 A | 10/1995 | Lucero | 235/380 |
| 5,559,312 A * | 9/1996 | Lucero | 235/380 |
| 5,811,772 A | 9/1998 | Lucero | 235/380 |
| 5,952,640 A | 9/1999 | Lucero | 235/380 |
| 5,959,277 A | 9/1999 | Lucero | 235/380 |
| 6,019,283 A | 2/2000 | Lucero | 235/380 |
| 6,142,369 A * | 11/2000 | Jonstromer | 235/380 |
| 6,190,256 B1 | 2/2001 | Walker et al. | 463/25 |
| 6,206,283 B1 * | 3/2001 | Bansal et al. | 235/379 |
| 6,378,073 B1 * | 4/2002 | Davis et al. | 713/200 |

* cited by examiner

Primary Examiner—Kim Nguyen
(74) Attorney, Agent, or Firm—George H. Gerstman; Seyfarth Shaw

(57) ABSTRACT

A gaming system method uses typically a wireless communication device, and includes the following steps: Call data is provided identifying a gaming system player. This would normally be a typical identifying number plus a PIN number. A call is initiated from the wireless communication device (such as a cell phone) through a telephone call network to a financial center, requesting a cash transfer. Based on the call data, the transfer is credited to the wireless communication device or to a casino, to the credit of the player. Upon receiving of the predetermined balance of the cash transfer, one may communicate, using the wireless communication device, to transfer a portion or all of the predetermined cash balance from the wireless communication device or casino to the credit of a particular gaming machine, thus enabling the gaming machine for play just as if physical cash has been provided to it.

24 Claims, 6 Drawing Sheets

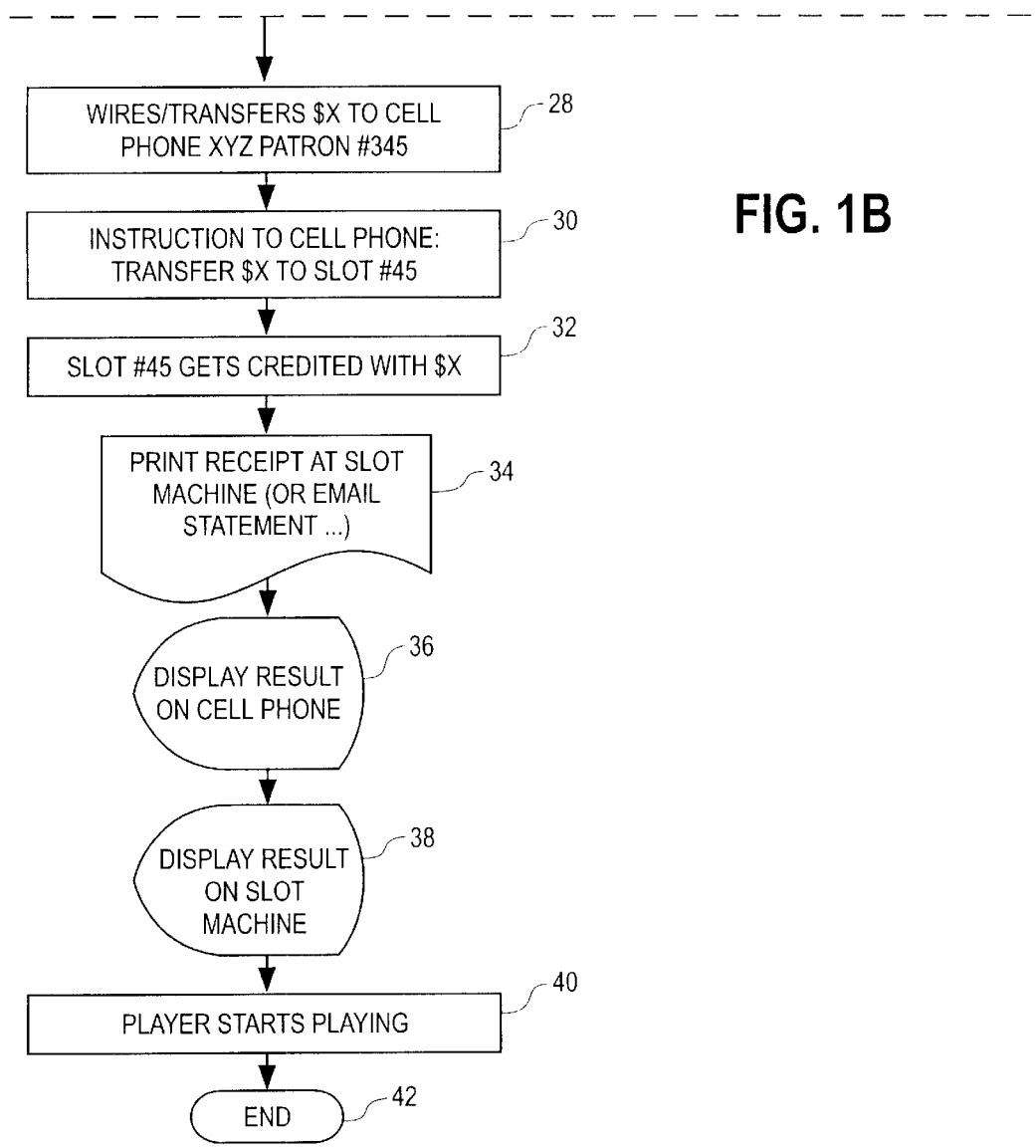

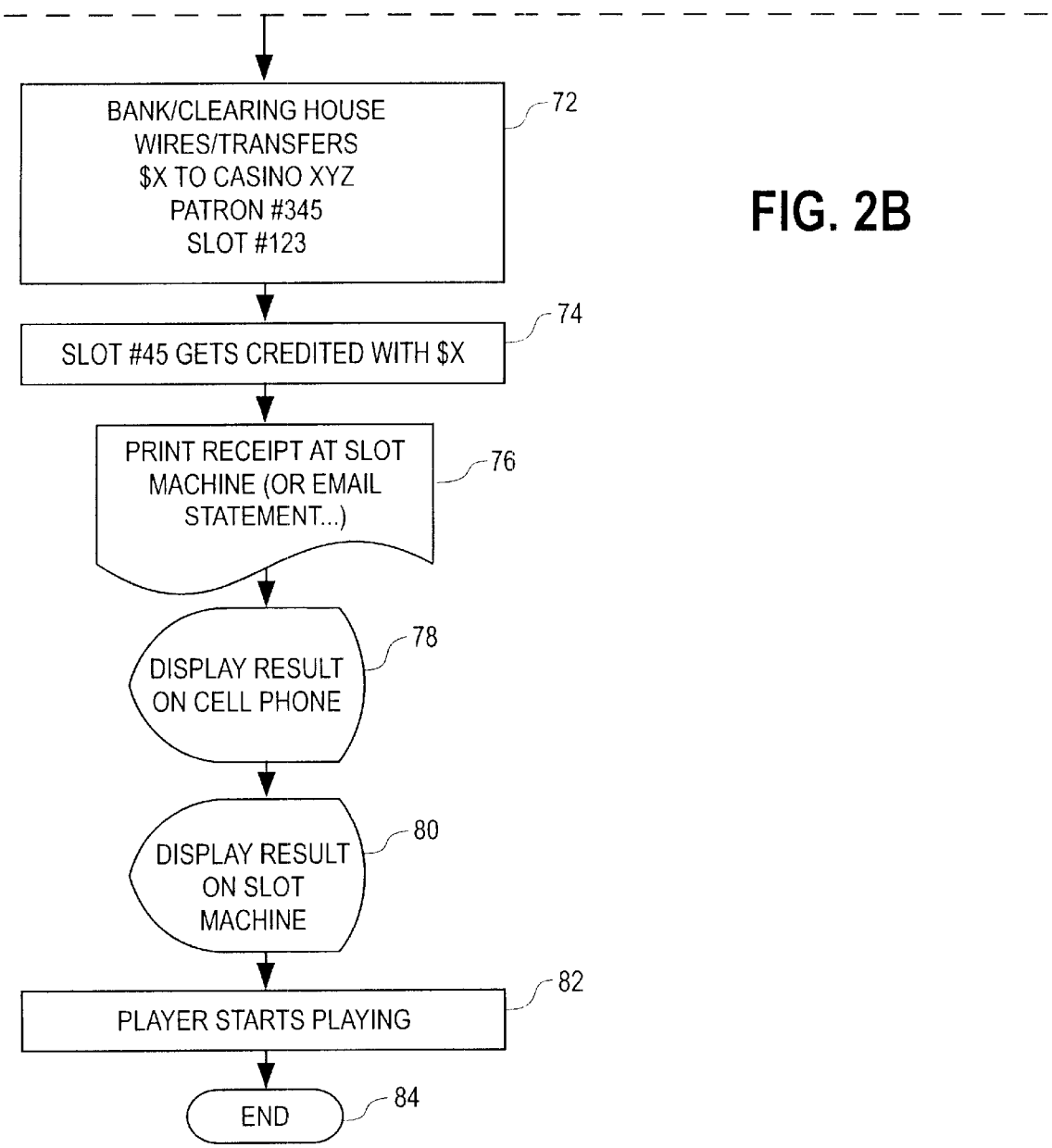

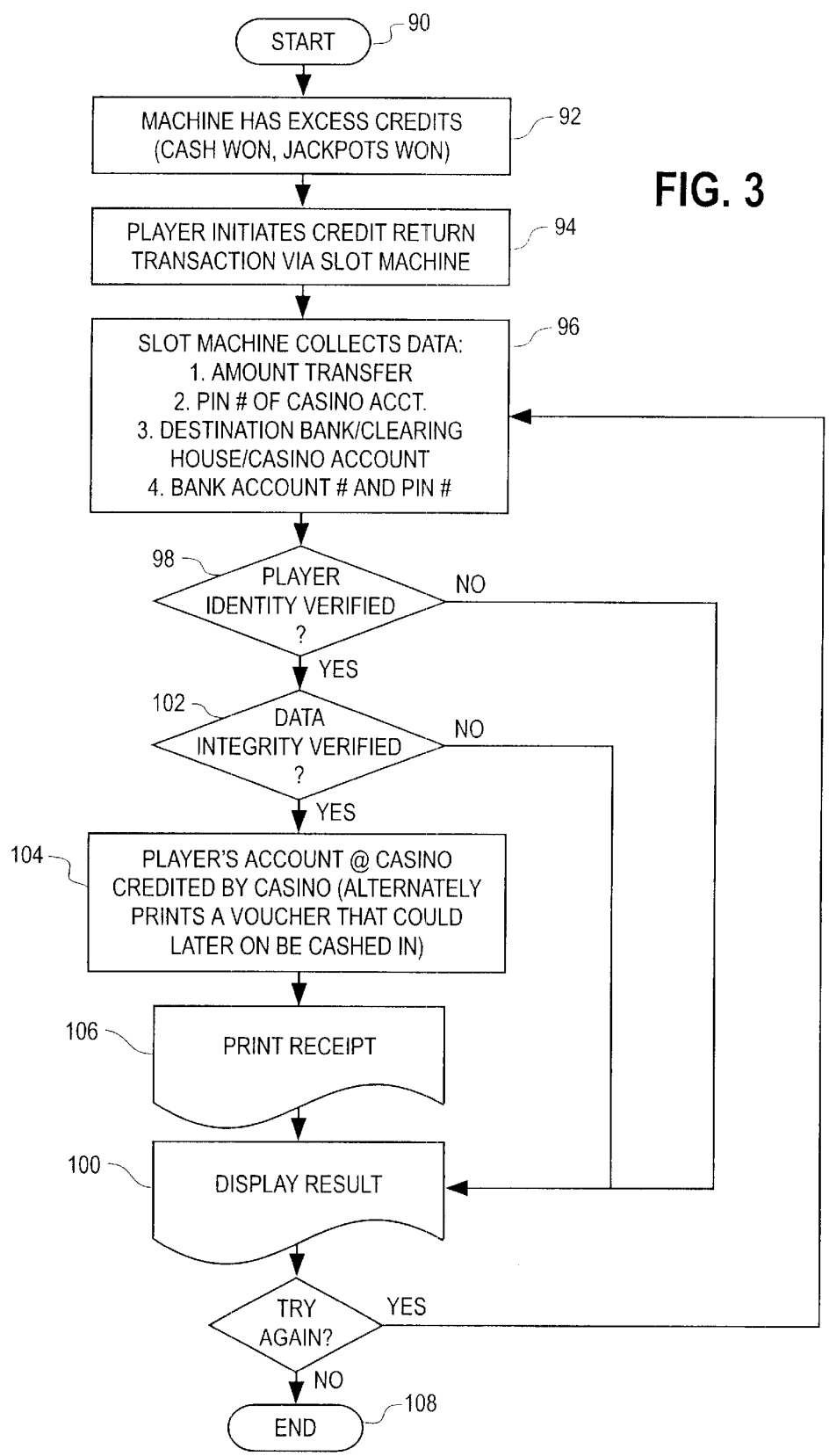

METHOD FOR CASHLESS GAMING

BACKGROUND OF THE INVENTION

Gaming machines are in wide use, particularly in various casinos, being largely games of chance, played for money with the hope of cash winnings.

Traditionally, the games have been played with coins or tokens. Often, players wish to continue playing, for example, at one particular machine where they expect a "jackpot", and thus are very reluctant to leave to get more coins or tokens, fearing that someone else will strike the jackpot when they leave the machine.

Accordingly, many players would be eager to have a way to keep on playing on a cashless basis, so that they can dispense with the need to carry credit cards, coins, and tokens. This provides the convenience of not having to carry such items plus the safety of not having to carry a large amount of cash or vulnerable cards, plus the convenience of not having to have too many cards i.e. various credit cards or membership cards in the programs of the various casinos.

While a charge card might be used to obtain credit for playing the machines, this generally requires the presence of a charge card reader at each machine, which is an undesirable expense. Accordingly, it would be desirable to provide a cashless and cardless system for use by customers. The system may operate in conjunction with a central computer connected to a network of machines, or directly with individual machines themselves having electronic capability for direct interface by the customer. Furthermore, by this invention, individual house cards do not have to be issued by various casinos and players don't need to enroll in casino's program. Rather, a cardless and cashless system is usable with a variety of casinos and other business establishments which have gaming machines (which are included in the scope of the definition "casino"), whether or not a machine is equipped with a card reader. This is an advantage because there currently are hundreds of thousands slot machines without card readers.

DESCRIPTION OF THE INVENTION

In one embodiment of the gaming system method of this invention, a wireless communication device is used, such as a cellular telephone, a personal digital assistant (PDA), a Palm V device, another portable computer, or the like, which device is capable of wireless (e.g. Infrared, Radio frequency, or microwave) data transmission, voice or otherwise. In this particular embodiment of the invention, the method includes the steps of: Providing call data identifying a gaming system player. The call is then initiated from the wireless communication device through a telephone call network to a financial center, which may be a bank, a money market fund, a clearing house, or another financial institution at which the player has an account. A cash transfer is made, based on the call data, with appropriate PIN numbers and other coded material as necessary to identify and legitimize the player and the wireless call. The cash transfer may be credited to the wireless communication device by the financial institution, typically by an encrypted transmission of data that is stored in the wireless communication device and authenticated by appropriate transaction codes. Alternatively, the cash transfer may be credited to a casino on behalf of the player.

One then communicates, simultaneously or later, using the wireless communication device, with the casino to transfer a portion (which may include all) of the predetermined cash balance from the wireless communication device to the credit of a particular gaming machine, which may be identified by a number or the like. This data may be provided directly to the gaming machine or via a central computer in the casino to the data machine, to enable the gaming machine to be played with the electronic cash transferred to it, being essentially identical to actual cash, thus providing the player with an electronic form of cash which may be used with the gaming machine. The player thus plays the particular gaming machine, using that portion of the cash balance which has been transferred to the machine.

As stated, this electronic transfer may be accomplished through a central computer of a network incorporating the gaming machine together with more like it, or the transfer maybe directly to a microprocessor in the gaming machine itself. Thus, making use of the wireless communication device such as his cell phone, the player does not have to leave the gaming machine, or carry cash or cards.

Thereafter, a subsequent step may be made, of communicating, using the wireless communication device, with the casino to obtain transfer of a cash balance from the particular gaming machine back to the wireless communication device (or to the casino, crediting the player). This cash balance may comprise winnings, and it also may comprise electronic cash initially provided by the above method to the machine.

Additionally or alternatively, thereafter, a subsequent step of communicating may be made, using the wireless communication device, to obtain transfer of such a remaining cash balance from the particular gaming machine to another gaming machine.

If desired, the step of communicating with the casino, either to a computer terminal or to individual machines, maybe accomplished by the use of an infrared communication system rather than the more conventional radio frequency communication. For example, the handheld device's built-infrared port may be used.

Typically, the player may enter routing transaction data, which may include destination and amount, into his cell phone or other wireless communication device that he carries, to allow transmission of money credited to the cell phone to one or more of the gaming machines and/or for other charges as well, such as restaurant and hotel bills. The cell phone or the like (or the casino) may have its own routing number for wiring funds so that funds may arrive to the cell phone or casino as a packet of encrypted data, in a manner similar to a fund transfer between banks. The cell phone may then electronically dispense funds in similar manner. The casino may receive, hold, and dispense funds on instruction from the player, via a cell phone or the like.

If desired, the basic data such as routing numbers and the like may be placed on a card, and swiped by the user through a card reader, followed by a PIN number, to prepare a transmission involving several long identification numbers and the like.

Specifically, wireless technology of the type being pioneered by AT&T Wireless Services may be used for the specific technology in conjunction with the method of this invention. Alternatively, various other systems are well known, and may be modified by those skilled in the art of programming and the like to make possible the use of the methods of this invention. Other systems that may be used include the Itineris Wireless Service with the iPIN platform of France Telecom. Also, the iPIN technology may be used in other ways to apply the method of this invention.

Encryption and other details of the process of this invention maybe embodied in the manner described in Nguyen U.S. patent application Ser. No. 09/732,650, filed Dec. 7, 2000.

The particular gaming machines used herein are of a large variety, incorporating, among others, slot machines of the spinning reel type; video gaming terminals, such as video poker; gaming software which provides a game session running on a computer, or other forms of mechanical, typically, coin operated, gaming machines.

While handheld wireless communication devices have been particularly disclosed as useable with this invention, it is also possible that the invention of this application may be used in conjunction with a wired telephone to achieve similar results to that described above.

Furthermore, if desired, the player can preload his cell phone, PDA, Palm device, portable computer, or the like with cash prior to coming to the casino for convenience. Corresponding wired devices might be used for this purpose as well.

As a further modification of this invention, the situation may be simplified for the player by preloading the communication device as mentioned immediately above with the necessary data for communication with the financial center so that the game player does not have punch in an elaborate series of account number and identification codes while in the casino. Furthermore, the system may be preset to a set limit such as $100 per day. Also, each transaction may be preset, for example $20 per transaction, of cash transferred to the appropriate destination as specified by the user, via if desired a preset routing address or one of a list of preset routing addresses, corresponding to the casinos where the gamer wishes to play. Thus the gamer can make that selection and transfer in a simple manner with just a few numbers.

Thus, the gamer can use his communication device to transfer limited amounts of cash by a process which maybe as simple as one touch, after calling for electronic access to the system, and, preferably, a pin number for authentication of the user, so that third parties will not have access to the process if they gain access to the communication device.

Another desired feature to the process is a step where the legality of the transaction is verified. For example, if in a particular state there is a law limiting the amount of money which may be electronically transferred for gaming to a particular amount, that can be built into a legality screen portion of the program.

DESCRIPTION OF DRAWINGS

In the drawings, FIGS. 1A and 1B comprise a single flow chart showing one embodiment of the method of this invention.

FIGS. 2A and 2B comprise a single flow chart showing another embodiment of the method of this invention.

FIG. 3 comprises a flow chart showing return of funds allocated to an individual gaming machine back to the player's account at the casino, or alternatively to his wire communication device.

DESCRIPTION OF SPECIFIC EMBODIMENTS

Figure 1A:
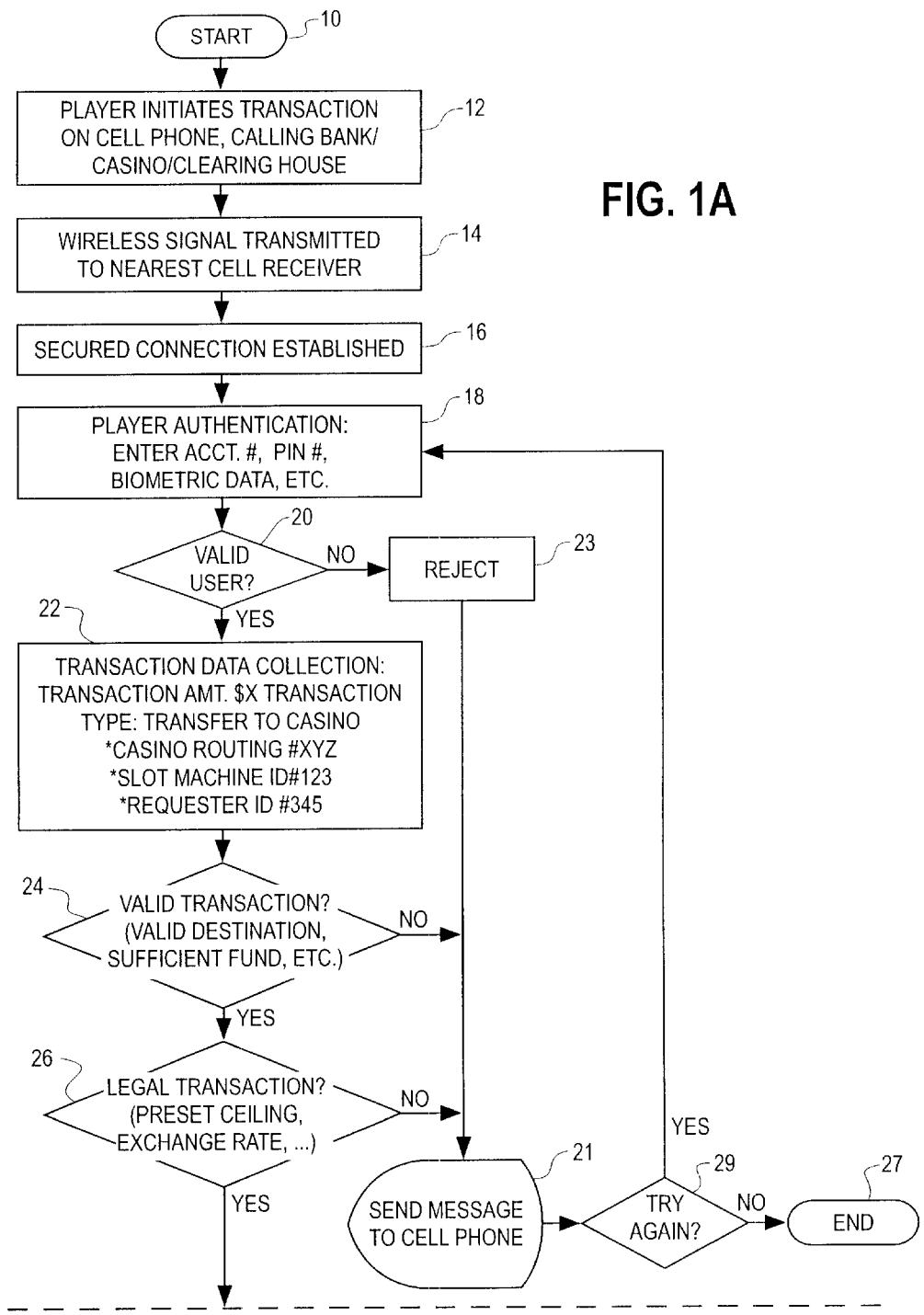

Referring to the drawings, FIGS. 1A and 1B show a flow chart for one embodiment of the method of this invention.

To start the process 10, the player initiates the transaction on the cell phone 12, calling his bank, clearing house, or even a casino where he has a credit balance.

As is conventional, the wireless signal from the cell phone 14 is transmitted to the nearest cell receiver and a secured connection 16 is established.

Authentication 18 then takes place. This may be built into the cell phone or other computer, or the player may have a card to swipe in an appropriate slot in the cell phone to pass in data about his account number, biometric data and the like, and the player enters his PIN number.

The financial institution determines the validity 20 of the user. If the request is invalid, a rejection 23 takes place, with a report being sent 21 to the cell phone. If the request is validated, transaction data 22 maybe sent, including the transaction amount, the transaction type: i.e., transfer in this instance of cash to the cell phone of the user, which has a routing address and thus may hold electronic cash in the records of the banking system. The requestor I.D. may also be provided and, if desired, instructions to route funds to a particular slot machine of the casino, which may have its own routing address, for a direct deposit of electronic cash into the machine, coupled with an identification number of the player.

The transaction is validated 24, in terms of validity of the destination, sufficient funds to support the cash transfer, and the like. If invalid, that is duly reported in the cell phone message 21. If valid, the transaction may be analyzed for legality 26 relating to such factors as a preset cash withdrawal ceiling, exchange rate issues, jurisdictional permission, and the like. If invalidated there, the message of that is provided 21 to the cell phone. If valid, the wire transfer 28 takes place through the cell phone or other wireless communication device of the patron or player. Transaction I.D. numbers for both are preferably given.

If the rejection 23 or another "no" rejection takes place, the cell phone message 21 may duly report that, as well as an invitation for the user to try again 29. The number of permitted tries may be limited to a certain number such as 3 or 5. If instructions to try again are provided, the system may recycle back to player authentication step 18. If the instructions to try again are negative, or if desired a certain number of attempts have failed, then the process ends 27.

Now that the cell phone has received funds, they maybe dispensed in any manner desired by the player. Instructions may have already been previously sent in step 22 for such transfer or dispensing, or, at this time, such instructions 30 may be sent to transfer a certain amount of money to a given slot machine ("slot#45"). Thus, the slot machine receives an electronic cash credit 32, and prints a receipt or otherwise indicates 34 the acquisition of the funds. The same result may also be displayed 36 on the cell phone and/or may be displayed 38 on the particular slot machine. Thus, the slot machine is ready for play 40, and the electronic transfer process terminates 42.

Thus, the player can obtain the funds he or she desires with a cell phone or other wireless communication device without any need to leave the game play area, without creating debt that has to be subsequently billed and paid, and without having to carry cash or a multitude of cards.

Figure 2A:
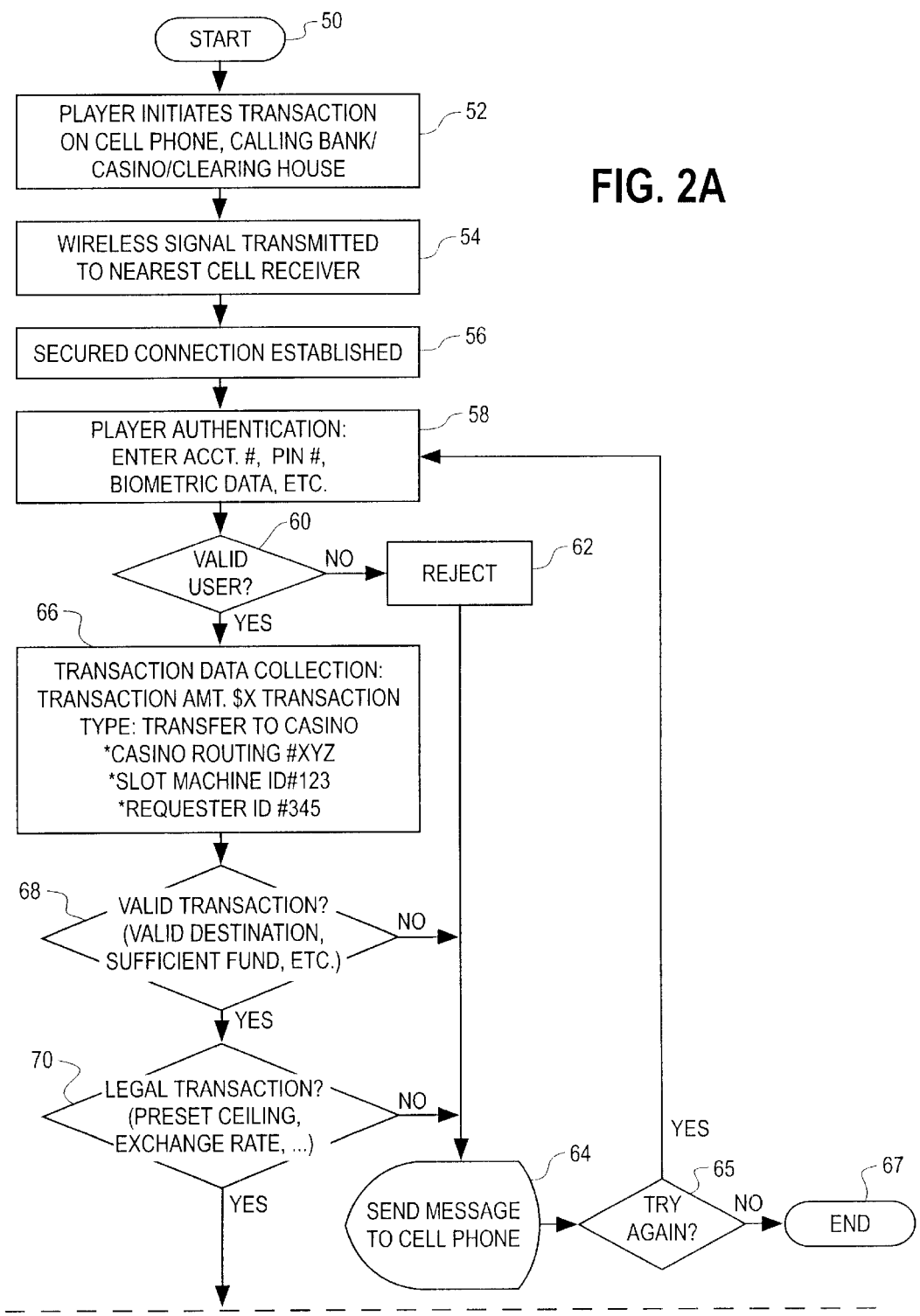

Turning to FIGS. 2A and 2B, a modified method of this invention is disclosed, in which the funds are transferred to the casino on behalf of the player rather than to the wireless communication device of the player. The player retains control of the process from his or her cell phone or other wireless communication device.

The start 50 begins when the player initiates the transaction on a cell phone 52 (or other wireless communication device), calling his or her bank, moneymarket fund, clearinghouse, or even a casino where a balance is maintained.

The wireless signal is transmitted 54 to the nearest cell receiver, and a secured connection 56 is established.

Player authentication 58 takes place in a manner similar to the corresponding player authentication step 18 in the previous embodiment. As before, an account number, biometric data, and a PIN number may be entered.

The user and phone call is evaluated 60. If invalid, rejection 62 takes place, and that rejection is communicated as a message 64 to the cell phone. If validated, transaction data 66 is transmitted, such as the amount of cash transferred, the routing number of the destination casino, the requestor I.D., and other necessary data. Also, if desired, the particular slot machine number may be entered here. As in the previous embodiment, upon a rejection the appropriate message 64 is sent to the cell phone. As previously, an invitation may be provided to try again 65. (Three to five attempts may be allowed.) If the user signals yes, the system recycles to player authentication step 58. If no, or if the predetermined number of unsuccessful tries occurs, the process ends 67.

The transaction is scrutinized 68 and, if invalid, an invalidity message is sent 64 to the cell phone. If valid, the transaction may be scrutinized 70 for legal issues such as a preset cash withdrawal ceiling, exchange rate, control issues and the like.

In step 72, the bank or a similar financial center or agency wires the transaction amount to a particular branch of the casino if appropriate, for the benefit of the patron under his identification number. The casino enables a particular slot machine for the patron's use, so that the particular slot machine 74 is credited with the transferred money. Alternatively, only a portion of the transferred money may be sent to the slot machine if the instructions are for that.

A receipt is printed 76 at the slot machine, or an e-mail confirmation, or electronic statement may be prepared and sent, or any other desired technique of accounting may be used, including normal mail statement delivery. Also, the transaction result 78 may be displayed on the cell phone and, if desired, the transaction result may be displayed 80 on the slot machine. The slot machine is now open for play 82, and the particular cash transfer and accounting process terminates 84.

Referring to FIG. 3, electronic cash in a gaming machine can be returned to the player's account.

The process starts 90 when the particular gaming machine has excess credits 92 resulting from cash won, jackpots won, or cash in the machine not expended, and the patron initiates a credit return transaction via the slot machine 94. This may be accomplished with the slot machine, the cell phone again, and/or other wireless communication device. In one embodiment using the slot machine, the slot machine collects data from the cell phone (or other communication), if not already present in the slot machine, pertaining to the amount of cash to transfer, the PIN number of the casino account, the destination bank or clearing house, or casino account to which the money is to be transferred, the account number and PIN number, as shown at step 96. From such data, the player's identity is scrutinized 98. If identity is not valid, such result will be displayed 100 on the gaming machine and also if desired on the cell phone. If the identity of the player is verified, then the data integrity may be scrutinized 102. The failure of data integrity, for example a request to withdraw too much money, once again results in no action except a display of such failure 100. If data integrity is verified, the player's account at the casino, or the bank or other financial institution (or his cell phone) is credited by an appropriate wire transfer or other communication 104. A receipt is printed 106, and the result may be displayed 100 on the machine if desired and/or on the cell phone if desired, following which the electronic transfer process may end 108.

In a manner similar to the previous embodiments, upon failure to properly identify the player's identity or the data, the result may be displayed 100 along with an invitation to try again 103. If the player chooses yes, the system recycles to step 96. If no, or optionally if a predetermined number of unsuccessful tries have occurred, the process ends 102.

As a further embodiment, instead of the player's account being credited by the casino at step 104, a voucher may be printed 106 that can later be cashed in.

Other embodiments using the wireless handheld device or cell phone may be similarly conducted.

Figure 4:
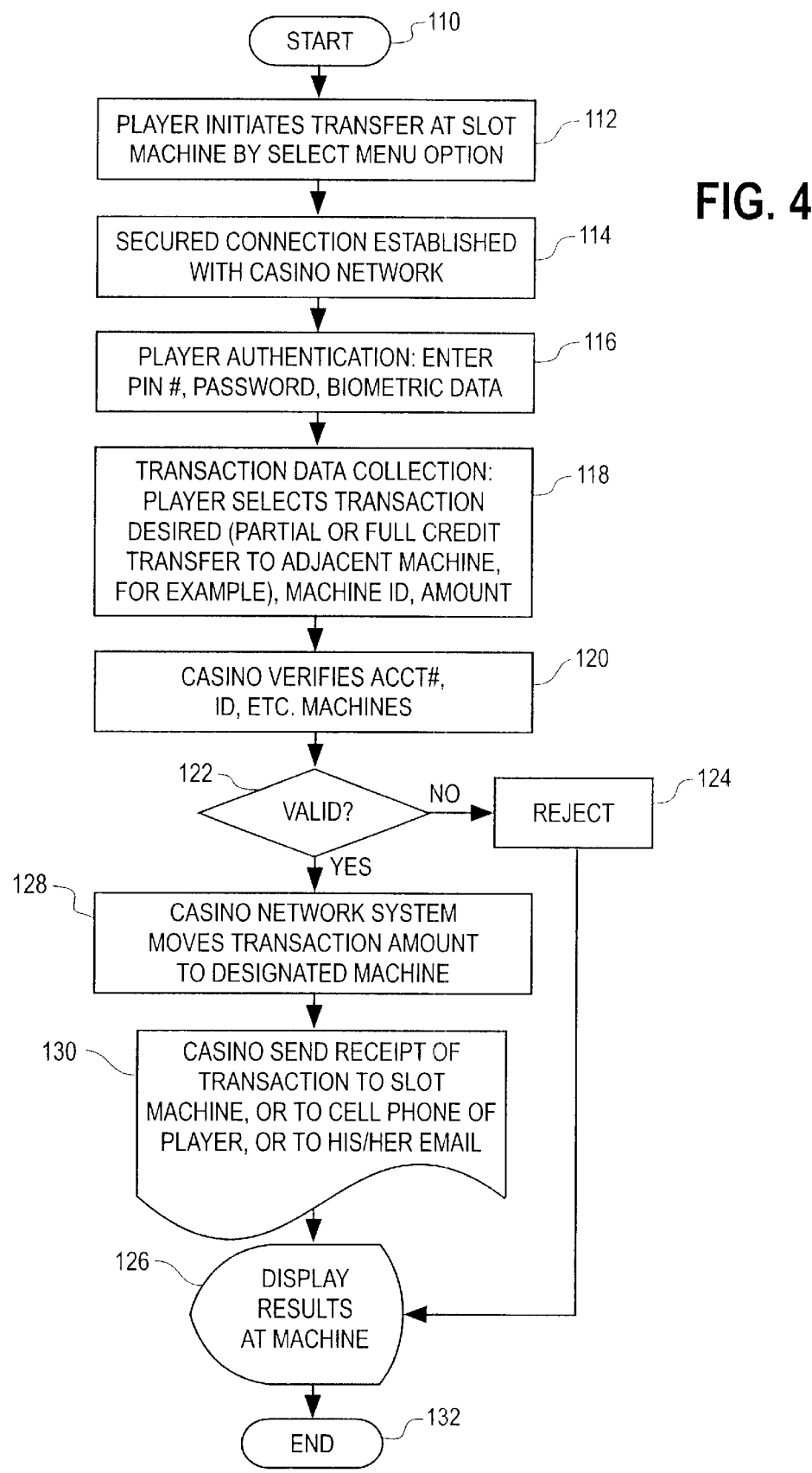
FIG. 4 is a flow chart showing how a player can transfer cash between gaming machines.

Referring to FIG. 4, a cash transfer from one gaming machine to another is shown. The process starts 110 as the player initiates a transfer at the slot machine, for example by selecting a menu option on the slot machine 112, or by use of his or her cell phone. When a secured connection is established 114 with the casino network, player authentication 116 may take place by entering of a PIN number, a password, biometric data and/or the like. The transaction data collection proceeds 118 in which the player selects instructions for partial or full credit transfer to an adjacent machine including the new machine I.D. number for transfer destination, and the amount transferred. This process may of course be simplified if one is operating this data transfer off of the first machine itself, since the machine is aware of some of the data which can be transferred to the new machine without going through the player's cell phone.

The casino verifies 120 the account number, the I.D. of the player, and the like, as well as the I.D. for both machines involved in the transfer. If not valid for any reason 122, rejection 124 takes place, with the results 126 being displayed on the machine. If valid, the casino network system moves the transaction 128 to the designated machine, thus transferring the cash. A receipt of the transaction is sent by the casino 130 to one or all of the destinations of the new or old slot machines, the cell phone, and/or e-mail or regular mail to the player, and the results may be displayed 126 at the machine, and the cash transfer process 132 ends.

Thus, a cardless process is disclosed in which players may obtain cash transfers for gaming at any location and at essentially any desired time. Since credit is not used in this system but only actual cash transfers, there is an element of protection of the game player against going into debt in wireless transactions for obtaining fluids. Also, limits on cash withdrawal may be provided in appropriate circumstances for protection of game players.

The above has been offered for illustrative purposes only, and is not to be understood as limiting the scope of the invention, which is as defined in the claims below.

That which is claimed is:

1. A gaming method using a cardless wireless communication device, including the steps of:

providing data identifying a gaming system player;

initiating a call from the cardless wireless communication device through a telephone network to a financial center;

requesting a cash transfer, based on said data, credited to said cardless wireless communication device, and receiving said cash transfer of a predetermined cash amount;

communicating, using said cardless wireless communication device, with a casino having a plurality of gaming machines to transfer a portion of the predetermined cash amount from the cardless wireless communication device to the credit of a particular gaming machine of said plurality of gaming machines; and playing the particular gaming machine using the portion of the predetermined cash amount so transferred.

2. The method of claim 1 in which said communicating with a casino comprises a direct communication with said particular gaming machine.

3. The method of claim 1 in which a subsequent step of communicating is made, using said cardless wireless communication device, with said casino to obtain transfer of a cash amount from the particular gaming machine back to the cardless wireless communication device.

4. The method of claim 1 in which a subsequent step of communicating is made, using said cardless wireless communication device, with said casino to obtain transfer of a cash amount from the particular gaming machine to another gaming machine.

5. The method of claim 1 in which communications to and from said cardless wireless communication device are encrypted.

6. The method of claim 1 in which authentication of the player is required.

7. The method of claim 1 in which the legality of the transaction from the cardless wireless communication device to the gaming machine is verified.

8. The method of claim 1 in which the step of communicating with the casino is performed by infrared transmission.

9. The method of claim 1 in which at least a portion of said data is preloaded into said cardless wireless communication device so that the player does not have to provide that data at the time that the cash transfer is desired.

10. The method of claim 1 in which a voucher is obtained from the gaming machine which may be redeemed for cash or credit.

11. A gaming method as defined in claim 1, in which said providing data step includes the step of providing biometric data.

12. A gaming method using a cardless communication device including the steps of:

providing data identifying a gaming system player;

initiating a call from the cardless communication device through a telephone network to a financial center;

requesting a cash transfer, based on said data, credited to the cardless communication device, to provide a predetermined cash amount;

communicating, using said cardless communication device, with a casino having a plurality of gaming machines, to allocate at least a portion of the predetermined cash amount to a particular gaming machine of said plurality of gaming machines; and playing the particular gaming machine using the portion of the predetermined cash amount so transferred.

13. The gaming method of claim 12 in which said cardless communication device is wired to the telephone network.

14. A gaming method as defined in claim 12, in which said providing data step includes the step of providing biometric data.

15. A gaming method as defined in claim 12, in which a voucher is obtained from the gaming machine which may be redeemed for cash or credit.

16. A gaming method using a cardless communication device, including the steps of:

providing to said cardless communication device preloaded data for identifying a gaming system player and for rapid dialing;

initiating a call from the cardless communication device through a telephone network to a financial center;

requesting a predetermined cash transfer amount, based on said preloaded data, to the cardless communication device; and using said cardless communication device, transferring at least a portion of the predetermined cash transfer amount to a gaming machine.

17. A gaming method as defined in claim 16, in which said preloaded data includes a time period credit limit.

18. A gaming method as described in claim 16, in which said preloaded data includes a credit limit.

19. A gaming method as defined in claim 16, in which said preloaded data includes the address of a casino where the gaming system player wishes to play.

20. A gaming method as defined in claim 16, in which said providing preloaded data step includes the step of providing biometric data.

21. A gaming method as defined in claim 16, in which a voucher is obtained from the gaming machine which may be redeemed for cash or credit.

22. A gaming method as defined in claim 21, in which said voucher is printed.

23. A gaming method as defined in claim 21 in which said voucher is electronic.

24. A gaming method using a card less communication device, including the steps of:

providing to said cardless communication device preloaded data for identifying a gaming system player and for one touch dialing;

initiating a call from the cardless communication device through a telephone network to a financial center;

requesting a predetermined cash transfer amount, based on said preloaded data, to the cardless communication device;

using said cardless communication device, transferring at least a portion of the predetermined cash amount to a gaming machine;

said preloaded data including a limit selected from the group consisting of (a) a time period credit limit, and (b) a credit limit, and said preloaded data including data being selected from the group consisting of (a) a phone number, (b) routing address, (c) account number, (d) casino's address, (e) transfer limit, (f) amount of transfer, (g) player identification, (h) PIN Number, (i) biometric data.

* * * * *